Fig. 1

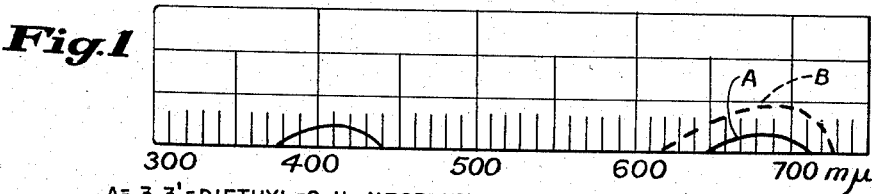

A = 3,3'-DIETHYL-9,11-NEOPENTYLENETHIADICARBOCYANINE IODIDE
B = 3,3'-DIETHYL-9,11-NEOPENTYLENETHIADICARBOCYANINE IODIDE WITH 4,4'-BIS(4-PHENOXY-6-β-HYDROXYETHYLAMINO-S-TRIAZIN-2-YLAMINO) STILBENE-2,2'-DISULFONIC ACID

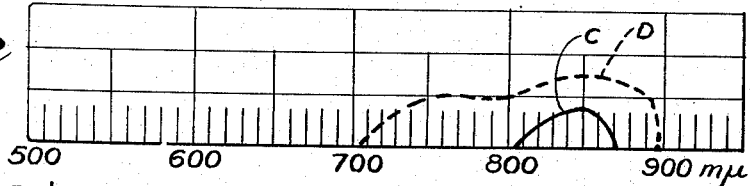

Fig. 2

C = 3,3'-DIETHYL-9,11-NEOPENTYLENE-6,7,6',7'-DIBENZOTHIATRICARBOCYANINE IODIDE
D = 3,3'-DIETHYL-9,11-NEOPENTYLENE-6,7,6'7' DIBENZOTHIATRICARBOCYANINE IODIDE WITH 4,4'-BIS(4-PHENOXY-6-β-HYDROXYETHYLAMINO-S-TRIAZIN-2-YLAMINO) STILBENE-2,2'-DISULFONIC ACID

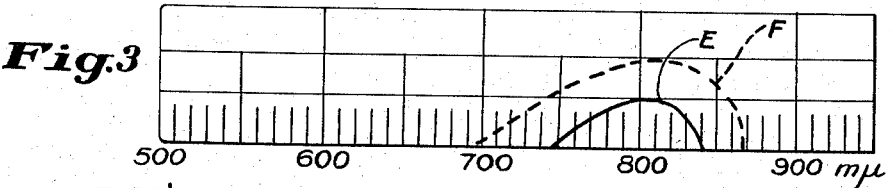

Fig. 3

E = 3,3'-DIETHYL-9,11-NEOPENTYLENETHIATRICARBOCYANINE IODIDE
F = 3,3'-DIETHYL-9,11-NEOPENTYLENETHIATRICARBOCYANINE WITH 4,4'-BIS(4-PHENOXY-6-β-HYDROXYETHYLAMINO-S-TRIAZIN-2-YLAMINO) STILBENE-2,2'-DISUFONIC ACID

Burt H. Carroll
Jean E. Jones
INVENTORS

United States Patent Office 2,875,058
Patented Feb. 24, 1959

2,875,058
SUPERSENSITIZATION OF PHOTOGRAPHIC EMULSIONS USING TRIAZINES

Burt H. Carroll and Jean E. Jones, Rochester, N. Y., assignors to Eastman Kodak Company, Rochester, N. Y., a corporation of New Jersey Application October 12, 1955, Serial No. 540,053

17 Claims. (Cl. 96—104)

This invention relates to photographic silver halide emulsions containing certain cyanine dyes, and as supersensitizers therefor, bis-triazinylaminostilbene compounds.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i. e., increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

We have now found another means of altering the sensitivity in emulsions containing certain cyanine dyes. Since the conditions in the emulsion, i. e., the hydrogen ion and/or the silver ion concentration undergo little or no change in our method, we shall designate our method as a kind of supersensitization.

It is, therefore, an object of our invention to provide photographic emulsions containing certain cyanine dyes and, as supersensitizers therefor, bis-triazinylaminostilbene compounds. Another object is to provide a process for preparing these supersensitized emulsions. Still another object is to provide photographic emulsions containing certain cyanine dyes and bis-triazinylaminostilbene compounds which are especially useful in color photography. Other objects will become apparent from a consideration of the following description and examples.

The cyanine dyes which are useful in practicing our invention can advantageously be represented by the following general formula:

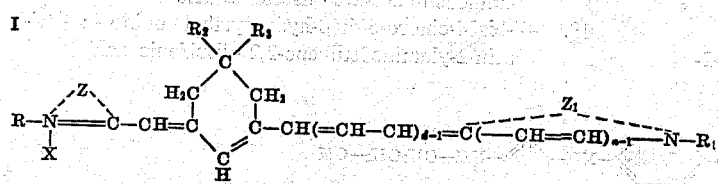

wherein R and $R_1$ each represents an alkyl group (e. g., methyl, ethyl, β-hydroxyethyl, carboxymethyl, β-carboxyethyl, carbomethoxymethyl, carbethoxymethyl, etc.), $R_2$ and $R_3$ each represents a hydrogen atom or a methyl group, X represents an acid radical (e. g., chloride, bromide, iodide, perchlorate, thiocyanate, p-toluenesulfonate, benzenesulfonate, methylsulfate, ethylsulfate, etc.), d represents a positive integer of from 1 to 3, n represents a positive integer of from 1 to 2, Z represents the non-metallic atoms necessary to complete a heterocyclic nucleus of the benzothiazole series (e. g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole 5-iodobenzothiazole, 6-iodobenzothiazole, 4-ethoxybenzothiazole, 5-ethoxybenzothiazole, 5,6-dimethylbenzothiazole, 5-hydroxybenzothiazole, 6-hydroxybenzothiazole, etc.), or a heterocyclic nucleus of the naphthothiazole series (e. g., α-naphthothiazole, β-naphthothiazole, 7-methoxy-α-naphthothiazole, 8-methoxy-α-naphthothiazole, 5-methoxy-β-naphthothiazole, 5-ethoxy-α-naphthothiazole, etc.), and $Z_1$ represents the non-metallic atoms necessary to complete a heterocyclic nucleus containing from 5 (n is 1) to 6 (n is 2) atoms in the heterocyclic ring, such as a heterocyclic nucleus of the benzothiazole series (e. g., those nuclei listed under Z above), a heterocyclic nucleus of the naphthothiazole series (e. g., those nuclei listed under Z above), a heterocyclic nucleus of the benzoselenazole series (e. g., benzoselenazole, 5-chlorobenzoselenazole, 6-methoxybenzoselenazole, 5-methoxybenzoselenazole, etc.), a heterocyclic nucleus of the naphthoselenazole series (e. g., α-naphthoselenazole, β-naphthoselenazole, etc.), a heterocyclic nucleus of the benzoxazole series (e. g., benzoxazole, 5-hydroxybenzoxazole, 6-hydroxybenzoxazole, 5-chlorobenzoxazole, 5-methoxybenzoxazole, 6-methoxybenzoxazole, 5-phenylbenzoxazole, 5-bromobenzoxazole, etc.), and a heterocyclic nucleus of the naphthoxazole series (e. g., α-naphthoxazole, β-naphthoxazole, etc.), a heterocyclic nucleus of the 2-quinoline series (e. g., 2-quinoline, 6-methyl-2-quinoline, 7-methyl-2-quinoline, 8-methyl-2-quinoline, 6-chloro-2-quinoline, 8-chloro-2-quinoline, 4-chloro-2-quinoline, 5-ethoxy-2-quinoline, 6-ethoxy-2-quinoline, 7-ethoxy-2-quinoline, 6-hydroxy-2-quinoline, 7-hydroxy-2-quinoline, 6-methoxy-2-quinoline, etc.), a heterocyclic nucleus of the 4-quinoline series (e. g., 4-quinoline, 6-methoxy-4-quinoline, 7-methyl-4-quinoline, 8-methyl-4-quinoline, etc.), a heterocyclic nucleus of the benzimidazole series (e. g., benzimidazole, 5-chlorobenzimidazole, 5,6-dichlorobenziidazole, 1,7-trimethylenebenzimidiazole, etc.), and a heterocyclic nucleus of the 5,6-benzoquinoline series (e. g., 5,6-benzo-2-quinoline, etc.).

The bis-triazinylaminostilbene compounds useful in practicing our invention have been previously employed in the art as fluorescent agents and as bleaching (optical) agents, and hence are widely known substances. Especially useful compounds of this class comprise those compounds represented by the following general formula:

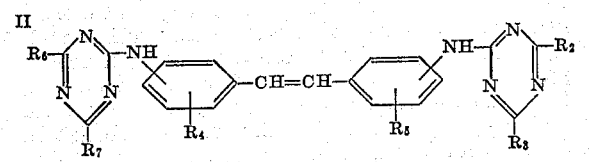

wherein $R_6$, $R_7$, $R_2$, and $R_3$ each represents a hydrogen atom, or a substituent group, such as hydroxyl, aryloxyl (e. g., phenoxyl, o-toloxyl, p-sulfophenoxyl, etc.), alkoxyl (e. g., methoxyl, ethoxyl, etc.), a halogen atom (e. g., chlorine, bromine, etc.), a heterocyclic radical (e. g., morpholinyl, piperidyl, etc.), an alkylthio group (e. g., methylthio, ethylthio, etc.), an arylthio group (e. g., phenylthio, tolylthio, etc.), a heterocyclylthio group (e. g., benzothiazylthio, etc.), an amino group, an alkylamino group (e. g., methylamino, ethylamino, propylamino, dimethylamino, diethylamino, dodecylamino, cyclohexylamino, β-hydroxyethylamino, di-β-hydroxyethylamino, β-sulfoethylamino, etc.), an arylamino group (e. g., anilino, o-, m-, and p-sulfoanilino, o-, m-, and p-chloroanilino, o-, m-, and p-anisylamino, o-, m-, and p-toludino, o-, m-, and p-carboxyanilino, hydroxyanilino, sulfonaphthylamino, o-, m-, and p-aminoanilino, p-acetamidoanilino, etc.), etc., and $R_4$ and $R_5$ each represents a hydrogen atom or a water-solubilizing group, such as sulfo, carboxyl, etc. (as well as alkali metal or amine salts of such groups). Many of the compounds represented by Formula II above are known substances, and methods for preparing these compounds are well known. Listed below are representative compounds selected from those represented by Formula II, although our invention is not limited in any sense to these particular compounds. While the structural formulas are included for only the first three compounds, it is to be understood that the same numbering system is employed throughout the specification.

1.
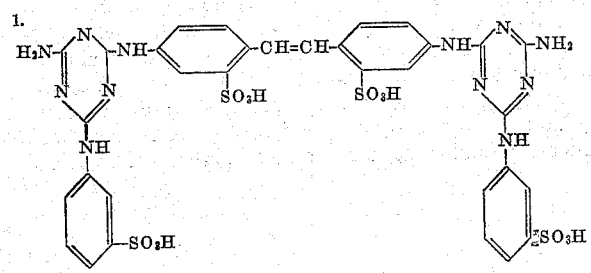

4,4'-bis[4-(3'-sulfoanilino)-6-amino-s-triazin-2-ylamino]-stilbene-2,2'-disulfonic acid 2.
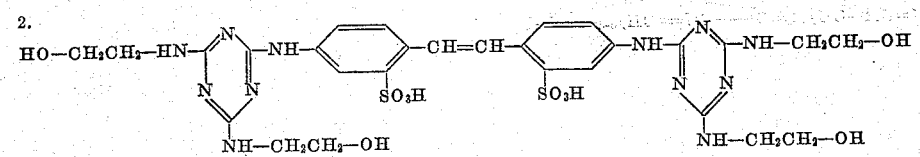

4,4'-bis[4,6-di(β-hydroxyethylamino)-s-triazin-2-ylamino]-stilbene-2,2'-disulfonic acid 3.
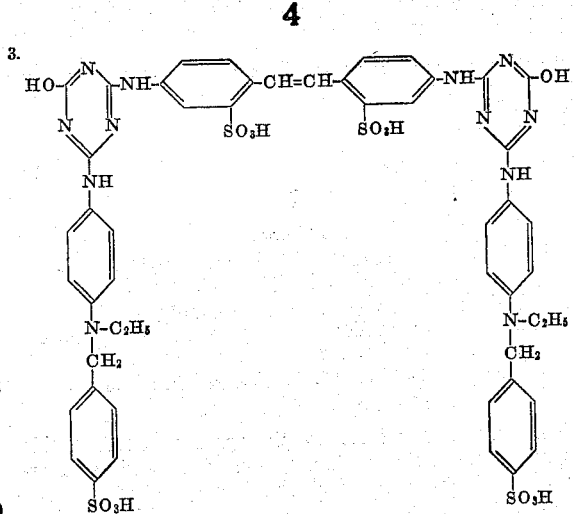

4,4'-bis{4-[4'-(N'-4''-sulfobenzyl-N'-ethyl)aminoanilino]-6-hydroxy-s-triazin-2-ylamino}stilbene-2,2'-disulfonic acid 4. 4,4'-bis[4-(4'-sulfoanilino)-6-β-hydroxyethylamino-s-triazin-2-ylamino]stilbene-2,2'-disulfonic acid
5. 4,4'-bis[4,6-dianilino-s-triazinyl-2-ylamino]stilbene-2,2'-disulfonic acid
6. 4,4'-bis[4-phenoxy-6-(β-hydroxyethylamino)-s-triazin-2-ylamino]stilbene-2,2'-disulfonic acid
7. 4,4'-bis(4,6-dianilino-s-triazin-2-ylamino)stilbene
8. 4,4'-bis(4,6-dihydroxy-s-triazin-2-ylamino)stilbene-2,2'-disulfonic acid
9. 4,4'-bis(4-anilino-6-hydroxy-s-triazin-2-ylamino)stilbene-2,2'-disulfonic acid
10. 4,4'-bis[4-(2'-chloroanilino)-6-hydroxy-s-triazin-2-ylamino]stilbene-2,2'-disulfonic acid
11. 4,4'-bis[4-(5'-sulfonaphthylamino)-6-hydroxy-s-triazin-2-ylamino]stilbene-2,2'-disulfonic acid
12. 4,4'-bis[4-n-dodecylamino-6-(β-sulfoethylamino)-s-triazin-2-ylamino]stilbene-2,2'-disulfonic acid
13. 4,4'-bis[4-N-morpholinyl-6-(4'-sulfoanilino)-s-triazin-2-ylamino]stilbene-2,2'-disulfonic acid
14. 4,4'-bis[4,6-di(N-morpholinyl)-s-triazin-2-ylamino]stilbene-2,2'-disulfonic acid
15. 4,4'-bis-{4-[4'-(5''-keto-3''-methyl-2''-pyrazolin-1''-yl)-anilino]-6-hydroxy-s-triazin-2-ylamino}stilbene-2,2'-disulfonic acid
16. 4-[4-ethylamino-6-di(β-hydroxyethyl)amino-s-triazin-2-ylamino]-4'-[4-methylamino-6-(β-hydroxyethylamino)-s-triazin-2-ylamino]stilbene-2,2-disulfonic acid
17. 4-[4-methylamino-6-(β-hydroxyethylamino)-s-triazin-2-ylamino]-4'-[4-ethylamino-6-(2'-anisidino)-s-triazin-2-ylamino]stilbene-2,2'-disulfonic acid
18. 4-[4-ethylamino-6-(β-hydroxyethylamino)-s-triazin-2-ylamino]-4'-[4,6-diamino-s-triazin-2-ylamino]stilbene-2,2'-disulfonic acid
19. 4-4'-bis[4-chloro-6-di(β-hydroxyethyl)amino-s-triazin-2-ylamino]stilbene-2,2'-disulfonic acid
20. 4,4'-bis[4-anilino-6-(β-hydroxyethylamino)-s-triazin-2-ylamino]stilbene-2,2'-disulfonic acid 21. 4,4'-bis[4-(4' - acetamidoanilino) - 6 - (β - hydroxyethylamino)-s-triazin-2-ylamino]stilbene-2,2' - disulfonic acid
22. 4,4'-bis[4-amino-6-(3'-carboxyphenylamino) - s - triazin-2-ylamino]stilbene-2,2'-disulfonic acid
23. 4-[4-phenoxy-6-(β-hydroxyethylamino)-s - triazin - 2-ylamino]-4'-[4-chloro - 6 - di(β - hydroxyethyl)-amino-s-triazin-2 - ylamino]stilbene - 2,2' - disulfonic acid
24. 4,4'-bis[4-ethylthio-6(β-hydroxyethylamino) - s - triazin-2-ylamino]stilbene-2,2'-disulfonic acid
25. 4,4'-bis[4-phenylthio-6-(β - hydroxyethylamino) - s-triazin-2-ylamino]stilbene-2,2'-disulfonic acid
26. 4,4'-bis(s-triazin-2-ylamino)stilbene - 2,2' - disulfonic acid
27. 4,4'-bis(4-hydroxy-6-amino-s-triazin-2 - ylamino)stilbene-2,2'-disulfonic acid
28. 4,4'-bis(4-chloro-6 - trimethylolmethylamino - s - triazin-2-ylamino)stilbene-2,2'-disulfonic acid Compounds of the above type which can advantageously be employed in practicing our invention have been described in one or more of the following representative patents:

United States:
   2,171,427, Aug. 29, 1939
   2,473,475, June 14, 1949
   2,595,030, Apr. 29, 1952
   2,660,578, Nov. 24, 1953
British:
   595,065, Nov. 26, 1947
   623,849, May 24, 1949
   624,051, May 26, 1949
   624,052, May 26, 1949
   678,291, Sept. 3, 1952
   681,642, Oct. 29, 1952
   705,406, Mar. 10, 1954

These products have been previously employed in the textile field, and are sold under such trade names as Leucophor B, Calcofluor White MR, Tinopal (SP, WR, BV277, 2B, GS, NG), Blancofor SC, Hiltamine (BSP, N, Sol., 6T6), and the like.

The dyes represented by Formula I above can advantageously be prepared as described in the copending application of D. W. Heseltine, Serial No. 400,810, filed December 28, 1953 (now U. S. Patent 2,734,900, issued Feb. 14, 1956), and also British Patent 595,784.

According to our invention, we incorporate one or more of the cyanine dyes represented by Formula I above with one or more s-triazinylaminostilbene compounds, such as those represented by Formula II above. Our invention is particularly directed to the ordinarily employed gelatino-silver-halide emulsions. However, our supersensitizing combinations can be employed in silver halide emulsions in which the carrier is other than gelatin, e. g., a resinous substance or cellulosic material which has no deteriorating effect on the light-sensitive materials. The cyanine dyes and s-triazinylaminostilbene compounds can be employed in various concentrations depending upon the effects desired.

Ordinarily, the optimum or near optimum concentration of the cyanine dyes which we employ in practicing our invention is of the order of from 0.010 to 0.30 g. per mol. of silver halide in the emulsion.

The s-triazinylaminostilbene compounds which we employ in our invention can advantageously be employed at a concentration of from about 0.03 to 10.0 g. per mol. of silver halide in the emulsion.

In general, the ratio of concentration of cyanine dye to s-triazinylaminostilbene compound can vary rather widely in our combinations, e. g., from 1:1 to 1:300 (by weight) in many cases.

The methods of incorporating sensitizing dyes in silver halide emulsions are well known to those skilled in the art. The s-triazinylaminostilbene compounds can be directly dispersed in the emulsions, or they can be dissolved in water (or an organic solvent, such as methanol, ethanol, etc., where the water-solubility is not sufficiently great) and added in the form of their solutions. While the cyanine dyes can be directly dispersed in the emulsions, it is convenient to add the same in the form of solutions in appropriate solvents. Methanol, ethanol, pyridine, and the like have proven satisfactory for many of the dyes of Formula I. Mixtures of solvents, e. g., pyridine diluted with methanol or acetone, can also be used. The cyanine dyes and s-triazinylaminostilbene compounds are dispersed in the finished emulsions and should be uniformly distributed throughout the emulsions. The following procedure is satisfactory: Stock solutions of the cyanine dyes and stilbene compounds are prepared by dissolving the same in appropriate solvents as described above. Then, to the flowable gelatino-silver-halide emulsion, the desired amounts of the stock solution of one of the dyes (or stilbene compounds) are slowly added, while stirring the emulsion. Stirring is continued until the dye is thoroughly incorporated in the emulsion. Then the desired amount of the stock solution of the stilbene compound (or dye, if stilbene compound has been added first) is slowly added to the emulsion, while stirring. Stirring is continued until the second solution is thoroughly incorporated. The supersensitized emulsion can then be coated out on a suitable support, such as glass, cellulose derivative film, resin film or paper, to a suitable thickness and allowed to dry. The details of such coating methods are well known to those skilled in the art. The foregoing procedures and proportions are to be regarded only as illustrative. Clearly, our invention is directed to any silver halide emulsion containing a combination of the aforesaid cyanine dyes and s-triazinylaminostilbene compounds whereby a supersensitizing effect is obtained.

The following examples will serve to illustrate further the manner of practicing our invention.

In Table I below, to different portions of the same batch of photographic gelatino-silver-halide emulsion were added (1) a cyanine dye, such as those represented by Formula I above, and (2) a combination of the cyanine dye and a bis(s-triazin-2-ylamino) stilbene (in neutral aqueous solution). Then the emulsions were held at about 40° C. for a short time and coated on a support, chill set, and dried. After exposure through a Wratten No. 25 filter, i. e., a filter which transmits substantially no light of wavelength shorter than about 580 m$\mu$, in an Eastman type IB sensitometer, the film strips were processed for 3 minutes in a developer having the following composition:

| | Grams |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |
| Water to make 1 liter. | |

The speed (red), gamma and fog for each of the coatings was then measured. The results are recorded in Table I.

TABLE I

| Example | Addenda and Dye (g./mol. AgX) | Red Light Exposure | | |
|---|---|---|---|---|
| | | 30/E Speed | Gamma | Fog |
| 1 | (a) 3,3'-diethyl-9,11-neopentylene-6,7,6',7'-dibenzothiadicarbocyanine iodide (.075) | 36 | 4.1 | .05 |
| | (b) dye (a) (.075) plus Calcofluor White MR¹ (.13) | 76 | 3.1 | .06 |
| 2 | (c) 3,3'-diethyl-9,11-neopentylenethiatetracarbocyanine iodide (.010) | .20 | 2.6 | .04 |
| | (d) dye (c) (.010) plus compound 4 (3.0) | .30 | 2.5 | .05 |
| 3 | (e) 3,3'-diethyl-9,11-neopentylenethiadicarbocyanine iodide (.0375) | 56 | 3.1 | .06 |
| | (f) dye (e) (.0375) plus compound 6 (2.5) | 117 | 2.4 | .06 |
| 4 | (g) 3,3'-diethyl-9,11-neopentylene-6,7,6',7'-dibenzothiatricarbocyanine iodide (.0375) | .40 | 3.5 | .05 |
| | (h) dye (g) (.0375) plus compound 6 (2.5) | 1.47 | 3.3 | .09 |
| 5 | (i) 3,3'-diethyl-9,11-neopentylenethiatricarbocyanine iodide (.0375) | .57 | 3.3 | .05 |
| | (j) dye (i) (.0375) plus compound 6 (2.5) | 1.95 | 2.5 | .06 |
| 6 | (k) dye (c) (.018) | .32 | 3.2 | .13 |
| | (l) dye (c) (.018) plus compound 6 (2.5) | .54 | 2.4 | .34 |
| 7 | (m) dye (e) (.050) | 13.7 | 2.4 | .05 |
| | (n) dye (e) (.050) plus Calcofluor White MR¹ (3.0) | 34.5 | 2.6 | .05 |
| 8 | (o) dye (c) (.010) | .22 | 2.7 | .05 |
| | (p) dye (c) (.010) plus Calcofluor White MR¹ (3.0) | .70 | 2.1 | .09 |
| 9 | (q) dye (e) (.075) | 22 | 3.4 | .06 |
| | (r) dye (e) (.075) plus Calcofluor White MR¹ (2.3) | 122 | 2.8 | .05 |
| 10 | (s) dye (i) (.0375) | 1.09 | 1.1 | .05 |
| | (t) dye (i) (.0375) plus Calcofluor White MR¹ (2.3) | 19.5 | 2.6 | .18 |
| 11 | (u) dye (c) (.018) | nil | nil | .13 |
| | (v) dye (c) (.018) plus Calcofluor White MR¹ (2.3) | 6.15 | 2.2 | .87 |
| 12 | (w) dye (g) (.0375) | 1.02 | 1.0 | .05 |
| | (x) dye (g) (.0375) plus Calcofluor White MR (2.3) | 5.1 | 3.2 | .11 |

¹ Calcofluor White MR is a bis(s-triazin-2-ylamino)stilbene-2,2'-disulfonic acid (sodium salt).

In the above table, the coatings of Example 1 were made from the same batch of gelatino-silver-chlorobromide emulsion, the coatings of Example 2 were made from the same batch of gelatino-silver bromiodide emulsion, the coatings of Examples 3, 4, 5 and 6 were made from the same batch of gelatino-silver-chlorobromide emulsion, the coatings of Examples 7 and 8 were made from the same batch of gelatino-silver-bromiodide emulsion, and the coatings of Examples 9, 10, 11, and 12 were made from the same batch of gelatino-silver-chlorobromide emulsion.

No measurements for the bis(s-triazin-2-ylamino)stilbene compounds alone are given, since these compounds have no sensitizing effect on the emulsions employed when used alone.

Our invention is primarily directed to the ordinarily employed gelatino-silver-halide developing-out emulsions, e. g., gelatino-silver-chloride, -chlorobromide, -chloroiodide, -chlorobromiodide, -bromide and -bromiodide developing-out emulsions. Emulsions which form the latent image mostly inside the silver halide grains, such as the emulsions set forth in U. S. Patent 2,456,956, dated December 21, 1948, can also be employed in practicing our invention.

The emulsions prepared in accordance with our invention can be coated in the usual manner on any suitable support, e. g., glass, cellulose nitrate film, cellulose acetate film, polyvinylacetal resin film, paper or metal.

Photographic silver halide emulsions, such as those listed above, containing the supersensitizing combinations of our invention can also contain such addenda as chemical sensitizers, e. g., sulfur sensitizers (e. g., allyl thiocarbamide, thiourea, allylisothiocyanate, cystine, etc.), various gold compounds (e. g., potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees, "The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibromacrolein (British 406,750), etc.; color couplers, such as those described in U. S. Patent 2,423,730; Spence and Carroll U. S. Patent 2,640,776, etc.; or mixtures of such addenda. Dispersing agents for color couplers, such as those set forth in U. S. Patents 2,322,027 and 2,304,940, can also be employed in the above-described emulsions.

Such silver halide emulsions can also contain thiazolidones or other ultraviolet absorbing compounds, such as those described in the copending application Serial No. 419,239, filed March 29, 1954, in the name of G. W. Sawdey, now U. S. Patent 2,739,888, issued March 27, 1956. While certain emulsion addenda, such as certain ultraviolet compounds, and certain color-forming compounds cause de-sensitization or un-sensitizing effects, it has been found that the new combinations of our invention largely overcome such effects. Typical color-forming compounds which can be so employed include those in U. S. Patent 2,322,027 and the following:

Coupler 1. 1-hydroxy-2-[δ-(2',4'-di-tert. amylphenoxy)-n-butyl]-naphthamide (U. S. Patent 2,474,293)
2. 1-hydroxy-4-phenylazo-4' - (p - tert. - butylphenoxy-2-naphthanilide (U. S. Patent 2,521,908)
3. 2-(2,4-di-tert. amylphenoxyacetamino)-4,6-dichloro-5-methyl phenol (Graham U. S. application Serial No. 285,544, now U. S. Patent 2,725,291)
4. 2-(α2,4-di-tert. amylphenoxy-n - butyrylamino) - 4,6-dichloro-5-methyl phenol
5. 6-{α-{4-[α-(2,4-di - tert. amylphenoxy)butyramido]-phenoxy}acetamido}-2,4-dichloro-3-methyl phenol
6. 2 - [3'-(2'',4''- diamylphenoxy) - acetamido] - benzamido-4-chloro-5-methyl phenol
7. 1-(2',4',6'-trichlorophenyl) - 3 - [3''-(2''',4'''-di-tert.-amylphenoxyacetamido)-benzamido]-5-pyrazolone (U. S. Patent 2,600,788)
8. 1-(2',4',6'-trichlorophenyl) - 3 - [3''-(2''',4'''-di-tert.-amylphenoxyacetamido)-benzamido] - 4 - (p-methoxyphenylazo)-5-pyrazolone
9. N - (4 - benzoylacetaminobenzenesulfonyl) - N - (γ-phenyl-propyl)-p-toluidine (U. S. Patent 2,298,443)
10. α-o-methoxybenzoyl-α-chloro-4-[α - (2,4 - di - tert.-amylphenoxy) - n - butyramido] - acetanilide (McCrossen U. S. application Serial No. 295,806, now U. S. Patent 2,728,658, issued December 27, 1955)
11. α-{3-[α-(2,4-di - tert. amylphenoxy)acetamido] - benzoyl}-2-methoxyacetanilide
12. 3-benzoylacetamido-4-methoxy - 2',4' - di - tert. amylphenoxy acetanilide 13. 4-benzoylacetamido-3-methoxy-2',4' - di - tert. amyl-phenoxy acetanilide The accompanying drawing illustrates the supersensitizing effect obtained with three of our new combinations in gelatino-silver-chlorobromide emulsions. Each figure of the drawing is a diagrammatic reproduction of two spectrograms. The sensitivity of the emulsion containing only the neopentylene dye represented by Formula I is represented by the solid line, while the sensitivity of the same emulsion containing both a neopentylene dye of Formula I and the triazine compound of Formula II is represented by the broken line. No curve for the emulsion containing the triazine compound of Formula II alone is given, since it has been found that these compounds alone generally have little or no measurable sensitizing effect on the emulsions.

In Fig. 1, curve A represents the sensitivity of an ordinary gelatino-silver-chlorobromide emulsion containing 3,3' - diethyl - 9,11 - neopentylenethiadicarbocyanine iodide, while curve B represents the sensitivity of the same emulsion sensitized with 3,3'-diethyl-9,11-neopentylenethiadicarbocyanine iodide and 4,4'-bis(4-phenoxy-6 - β - hydroxyethylamino - s - triazin - 2 - ylamino)-stilbene-2,2'-disulfonic acid.

In Fig. 2, curve C represents the sensitivity of an ordinary gelatino-silver-chlorobromide emulsion sensitized with 3,3' - diethyl - 9,11 - neopentylene - 6,7,6'7' - di-benzothiatricarbocyanine iodide, while curve D represents the sensitivity of the same emulsion sensitized with 3,3' - diethyl - 9,11 - neopentylene - 6,7,6'7' - dibenzo-thiatricarbocyanine iodide and 4,4'-bis(4-phenoxy-6-β-hydroxyethylamino - s - triazin - 2 - ylamino)stilbene - 2,2'-disulfonic acid.

In Fig. 3, curve E represents the sensitivity of an ordinary gelatino-silver-chlorobromide emulsion containing 3,3' - diethyl - 9,11 - neopentylenethiatricarbocyanine iodide, while curve F represents the sensitivity of the same emulsion sensitized with 3,3'-diethyl-9,11-neopentylenethiatricarbocyanine iodide and 4,4'-bis(4-phenoxy - 6 - β - hydroxyethylamino - s - triazin - 2 - ylamino)stilbene-2,2'-disulfonic acid.

Sensitometric measurements for coatings similar to those shown in Figs. 1, 2 and 3 are given in Examples 3, 4 and 5, respectively, of Table I above.

By bis(s - triazin - 2 - ylamino)stilbene compound, we mean a compound of the following structure:

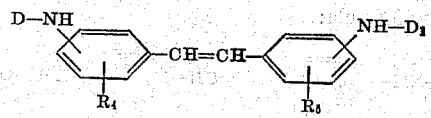

wherein $R_4$ and $R_5$ each have the values given above and D and $D_1$ each represents a s-triazin-2-yl nucleus. We have also found that the triazine compound of Formula II above wherein $R_2$, $R_3$, $R_6$ and/or $R_7$ each represents a heterocyclyamino group (e. g., 2-benzothiazylamino, 2-pyridylamino, etc.) can also be used to advantage in our invention. We have found also that the compounds of Formula II, in addition to their supersensitizing effect, have an antistaining and antifoggant effect in certain emulsions containing color couplers, such as those set forth above.

The disulfonic acids of Formula II are generally employed in neutral aqueous solution as mentioned above, i. e., the free acids are at least partially neutralized with sodium hydroxide, potassium hydroxide, sodium carbonate, ammonia, triethylamine, etc. before use in the emulsions. The corresponding disulfonic acid salts result. It is thus possible to adjust the pH of these aqueous solutions so that they are about the same as the pH of the emulsions.

What we claim as our invention and desire secured by Letters Patent of the United States is:

1. A photographic silver halide emulsion sensitized with a supersensitizing combination of at least one cyanine dye selected from the class represented by the following general formula:

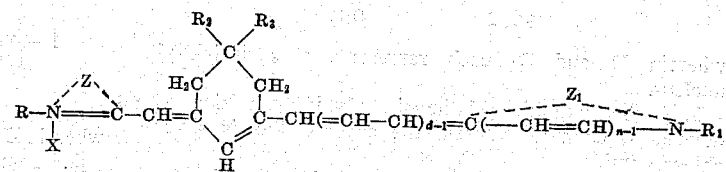

wherein R and $R_1$ each represents an alkyl group containing from 1 to 4 carbon atoms, $R_2$ and $R_3$ each represents a member selected from the group consisting of a hydrogen atom and a methyl group, X represents an acid radical, d represents a positive integer of from 1 to 3, n represents a positive integer of from 1 to 2, Z represents the non-metallic atoms necessary to complete a heterocyclic nucleus selected from the group consisting of those of the benzothiazole series and those of the naphthothiazole series, and $Z_1$ represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, those of the 2-quinoline series, those of the 4-quinoline series, those of the benzimidazole series, and those of the benzoquinoline series, and at least one bis-(s-triazin-2-ylamino)stilbene compound selected from the class represented by the following general formula:

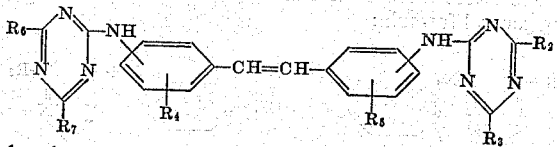

wherein $R_2$, $R_3$, $R_6$ and $R_7$ each represents a member selected from the group consisting of a hydrogen atom, a hydroxyl group, an aryloxy group, an alkoxyl group, a halogen atom, a heterocyclic radical, an alkylthio group, an arylthio group, and an amino group, and $R_4$ and $R_5$ each represents a member selected from the group consisting of a hydrogen atom and a sulfo group.

2. A photographic gelatino-silver-halide developing-out emulsion sensitized with at least one cyanine dye selected from the class represented by the following general formula:

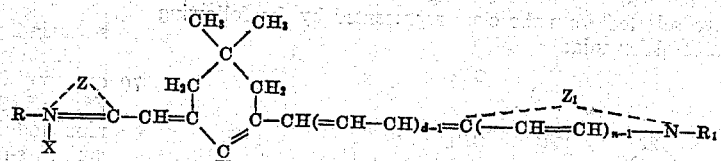

wherein R and $R_1$ each represents an alkyl group containing from 1 to 2 carbon atoms, d represents a positive integer of from 1 to 3, n represents a positive integer of from 1 to 2, X represents an acid radical, Z represents the non-metallic atoms necessary to complete a heterocyclic nucleus selected from the group consisting of those of the benzothiazole series and those of the naphthothiazole series, and $Z_1$ represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, those of the 2-quinoline series, those of the 4-quinoline series, those of the benzimidazole series, and those of the benzoquinoline series, and at least one bis(s-triazin-2-ylamino)stilbene compound selected from the class represented by the following general formula:

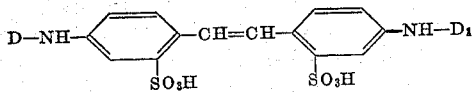

wherein D and $D_1$ each represents a s-triazin-2-yl nucleus.

3. A photographic gelatino-silver-halide emulsion as defined in claim 2 wherein the silver halide is silver chlorobromide.

4. A photographic gelatino-silver-halide emulsion as defined in claim 2 wherein the silver halide is silver bromiodide.

5. A photographic gelatino-silver-halide emulsion sensitized with a supersensitizing combination of a cyanine dye selected from the class represented by the following general formula:

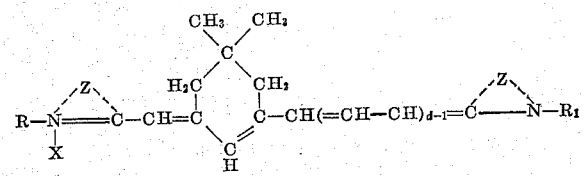

wherein R and $R_1$ each represents an alkyl group containing from 1 to 2 carbon atoms, X represents an acid radical, d represents a positive integer of from 1 to 3, and Z represents the non-metallic atoms necessary to complete a heterocyclic nucleus of the benzothiazole series, and at least one bis(s-triazin-2-ylamino)stilbene compound selected from the class represented by the following general formula:

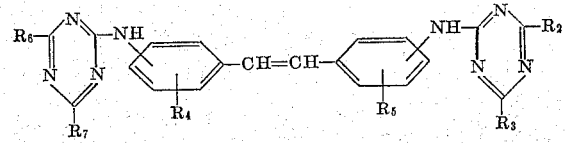

wherein $R^2$, $R_3$, $R_6$ and $R_7$ each represents a member selected from the group consisting of a hydrogen atom, a hydroxyl group, an aryloxy group, an alkoxyl group, a halogen atom, a heterocyclic radical, an alkylthio group, an arylthio group, and an amino group and $R_4$ and $R_5$ each represents a member selected from the group consisting of a hydrogen atom and a sulfo group.

6. A photographic gelatino-silver-halide emulsion sensitized with a supersensitizing combination of a cyanine dye selected from the class represented by the following general formula:

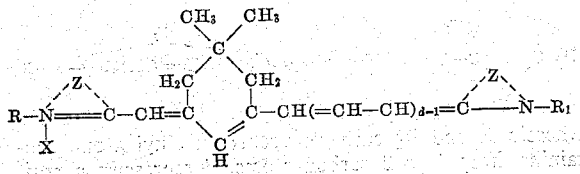

wherein R and $R_1$ each represents an alkyl group containing from 1 to 2 carbon atoms, X represents an acid radical, d represents a positive integer of from 1 to 3, and Z represents the non-metallic atoms necessary to complete a heterocyclic nucleus of the benzothiazole series, and at least one bis(s-triazin-2-ylamino)stilbene compound selected from the class represented by the following general formula:

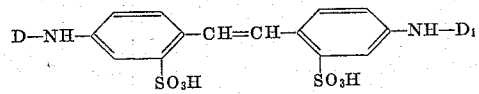

wherein D and $D_1$ each represents a s-triazin-2-yl nucleus.

7. A photographic gelatino-silver-halide developing-out emulsion sensitized with a supersensitizing combination of a 3,3'-diethyl-9,11-neopentylenethiatetracarbocyanine salt and at least one bis(s-triazin-2-ylamino)stilbene compound selected from the class represented by the following formula:

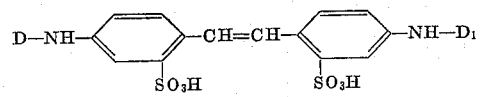

wherein D and $D_1$ each represents a s-triazin-2-yl nucleus.

8. A photographic gelatino-silver-halide developing-out emulsion sensitized with a supersensitizing combination of 3,3' - diethyl - 9,11 - neopentylenethiatetracarbocyanine iodide and 4,4'-bis[4-(4'-sufoanilino)-6-β-hydroxyethylamino - s - triazin - 2 - ylamino] - stilbene - 2,2' - disulfonic acid.

9. A photographic gelatino-silver-halide developing-out emulsion sensitized with a supersensitizing combination of a 3,3' - diethyl - 9,11 - neopentylenethiadicarbocyanine salt and at least one bis(s-triazin-2-ylamino)stilbene compound selected from the class represented by the following formula:

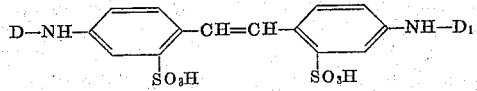

wherein D and $D_1$ each represents a s-triazin-2-yl nucleus.

10. A photographic gelatino-silver-halide developing-out emulsion sensitized with a supersensitizing combination of 3,3' - diethyl - 9,11 - neopentylenethiadicarbocyanine iodide and 4,4'-bis[4-phenoxy-6-(β-hydroxyethylamino) - s - triazin - 2 - ylamino]stilbene - 2,2' - disulfonic acid.

11. A photographic gelatino-silver-halide developing-out emulsion sensitized with a supersensitizing combination of a 3,3'-diethyl-9,11-neopentylenethiatricarbocyanine salt and at least one bis(s-triazin-2-ylamino)stilbene compound selected from the class represented by the following formula:

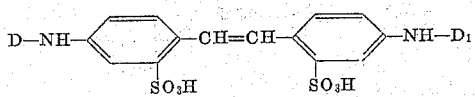

wherein D and $D_1$ each represents a s-triazin-2-yl nucleus.

12. A photographic gelatino-silver-halide developing-out emulsion sensitized with a supersensitizing combination of 3,3'-diethyl-9,11-neopentylenethiatricarbocyanine iodide and 4,4'-bis[4-phenoxy-6-(β-hydroxyethylamino)-s-triazin-2-ylamino]stilbene-2,2'-disulfonic acid.

13. A photographic gelatino-silver-halide developing-out emulsion sensitized with a supersensitizing combination of 3,3'-diethyl-9,11-neopentylenethiatetracarbocyanine iodide and 4,4'-bis[4-phenoxy-6-(β-hydroxyethylamino)-s-triazin-2-ylamino]-stilbene-2,2'-disulfonic acid.

14. A photographic gelatino-silver-halide emulsion sensitized with a supersensitizing combination of a cyanine dye selected from the class represented by the following general formula:

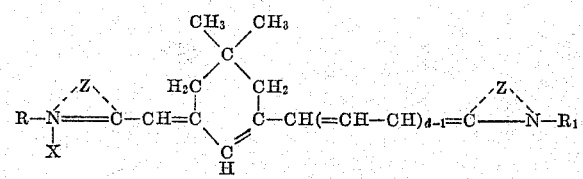

wherein R and $R_1$ each represents an alkyl group containing from 1 to 2 carbon atoms, X represents an acid radical, $d$ represents a positive integer of from 1 to 3, and Z represents the non-metallic atoms necessary to complete a heterocyclic nucleus of the naphthothiazole series, and at least one bis(s-triazin-2-ylamino)stilbene compound selected from the class represented by the following general formula:

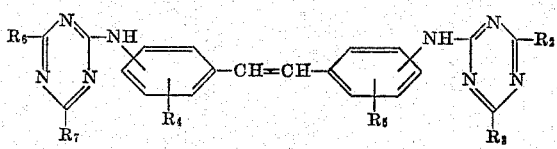

wherein $R_2$, $R_3$, $R_6$ and $R_7$ each represents a member selected from the group consisting of a hydrogen atom, a hydroxyl group, an aryloxy group, an alkoxyl group, a halogen atom, a heterocyclic radical, an alkylthio group, an arylthio group, and an amino group, and $R_4$ and $R_5$ each represents a member selected from the group consisting of a hydrogen atom and a sulfo group.

15. A photographic gelatino-silver-halide emulsion sensitized with a supersensitizing combination of a cyanine dye selected from those represented by the following general formula:

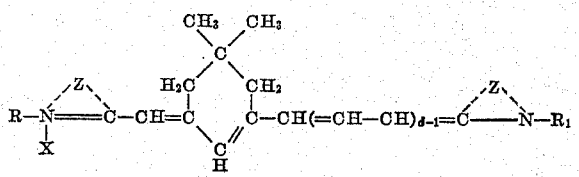

wherein R and $R_1$ each represents an alkyl group containing from 1 to 2 carbon atoms, X represents an acid radical, $d$ represents a positive integer of from 1 to 3, and Z represents the non-metallic atoms necessary to complete a heterocyclic nucleus of the naphthothiazole series, and at least one bis(s-triazin-2-ylamino)stilbene compound selected from the class represented by the following general formula:

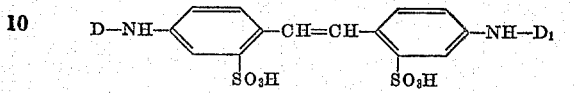

wherein D and $D_1$ each represents a s-triazin-2-yl nucleus.

16. A photographic gelatino-silver-halide developing-out emulsion sensitized with a supersensitizing combination of a 3,3′-diethyl-9,11-neopentylene-6,7,6′,7′-dibenzothiatricarbocyanine salt and at least one bis(s-triazin-2-ylamino)stilbene compound selected from the class represented by the following general formula:

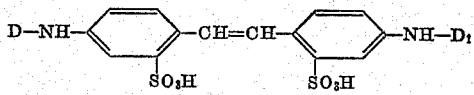

wherein D and $D_1$ each represents a s-triazin-2-yl nucleus.

17. A photographic gelatino-silver-halide developing-out emulsion sensitized with a supersensitizing combination of 3,3′-diethyl-9,11-neopentylene-6,7,6′,7′-dibenzothiatricarbocyanine iodide and 4,4′-bis[4-phenoxy-6-(β-hydroxyethylamino) - s - triazin - 2 - ylamino]stilbene-2,2′-disulfonic acid.

References Cited in the file of this patent
UNITED STATES PATENTS

| | | |
|---|---|---|
| 2,367,551 | Yule | Jan. 16, 1945 |
| 2,476,536 | Dersch | July 19, 1949 |
| 2,718,466 | Wolfson | Sept. 20, 1955 |
| 2,734,900 | Heseltine | Feb. 14, 1956 |